US012368634B2

(12) United States Patent
Breitenbach et al.

(10) Patent No.: US 12,368,634 B2
(45) Date of Patent: Jul. 22, 2025

(54) IDENTIFYING ROOT CAUSES OF NETWORK ANOMALIES

(71) Applicant: SAP SE, Walldorf (DE)

(72) Inventors: Tim Breitenbach, Mitgenfeld (DE); Bartosz Wilkusz, Mannheim (DE); Patrick Jahnke, Leimen (DE); Luke Gain, Morgan Hill, CA (US)

(73) Assignee: SAP SE, Walldorf (DE)

( * ) Notice: Subject to any disclaimer, the term of this patent is extended or adjusted under 35 U.S.C. 154(b) by 63 days.

(21) Appl. No.: 18/466,728

(22) Filed: Sep. 13, 2023

(65) Prior Publication Data

US 2025/0088410 A1  Mar. 13, 2025

(51) Int. Cl.
*G06F 11/07* (2006.01)
*H04L 41/0631* (2022.01)

(52) U.S. Cl.
CPC ........ *H04L 41/064* (2013.01); *G06F 11/0766* (2013.01)

(58) Field of Classification Search
CPC ... G06F 11/079; G06F 11/0766; H04L 41/064
USPC .............................................. 714/48, 25, 26
See application file for complete search history.

(56) References Cited

U.S. PATENT DOCUMENTS

| | | | | |
|---|---|---|---|---|
| 8,615,682 | B2* | 12/2013 | Yamamoto | H04L 41/5054 714/33 |
| 2013/0286852 | A1* | 10/2013 | Bowler | H04L 41/12 370/242 |
| 2013/0290791 | A1* | 10/2013 | Basile | H04L 41/22 714/47.1 |
| 2014/0310605 | A1* | 10/2014 | Basile | H04L 41/22 715/736 |
| 2019/0165988 | A1* | 5/2019 | Wang | H04L 41/065 |

* cited by examiner

*Primary Examiner* — Chae M Ko
(74) *Attorney, Agent, or Firm* — Fountainhead Law Group, PC (57) ABSTRACT

Root causes of network anomalies can be identified as follows. A subset of network entities that have experienced network anomalies during a time period are determined based on historical network data. A set of root cause candidates are selected among the plurality of network entities by iterating through the network topology, each root cause candidate being directly upstream of two or more network entities in the subset of network entities that have experienced network anomalies according to the network topology. Network entities that are root causes of the network anomalies are identified by removing root cause candidates that have a common upstream network entity that is also a root cause candidate from the set of root cause candidates leaving a set of remaining root cause candidates that are the root causes.

20 Claims, 7 Drawing Sheets

IDENTIFYING ROOT CAUSES OF NETWORK ANOMALIES

BACKGROUND

The present disclosure relates to computer networking and in particular to anomalies among network components and their root causes.

Network infrastructure is an important part of a data center environment. The network infrastructure enables external communication of the data center, such as communication between users with their computing devices and/or virtual machines (VMs), as well as data center internal communication, such as communication between computing devices and/or VMs. This network infrastructure may consist of both physical and virtual elements. Physical elements include hardware such as routers, switches, or network cards. Virtual components include software that runs on top of the physical devices and further divides the network into different subareas, like gateways or firewalls that block certain communication.

Although the physical elements may be secured by redundant connections, it can happen that a faulty component (e.g., misconfigured, damaged, worn out, or in an erroneous state) may be present in the data center for a long time without being fixed or replaced. If the redundancy fails as well, this may break connections with other devices, which may lead to non-reachable services. In addition, even before the redundancy breaks, the network traffic at some network interfaces may break down as a precursor for an outage, or the redundant pathways may become overloaded, leading to a worse user experience.

The present disclosure addresses these issue and others, as further described below.

SUMMARY

The present disclosure provides a computer system. The computer system includes one or more processors and one or more machine-readable medium coupled to the one or more processors. The one or more machine-readable medium store computer program code comprising sets of instructions. The instructions are executable by the one or more processors to determine a subset of network entities from among a plurality of network entities that have experienced network anomalies during a time period based on historical network data of the plurality of network entities over the time period. The plurality of network entities being arranged in a hierarchical network topology specifying which network entities are downstream of specific network entities and which other network entities are upstream of other specific network entities. The computer program code further comprising sets of instructions executable by the one or more processors to select a set of root cause candidates from among the plurality of network entities by iterating through the network topology. The set of root cause candidates being candidates for causing the network anomalies. The determination of the set root cause candidates based on the network topology and the subset of network entities that have experienced network anomalies. Each root cause candidate in the set of root cause candidates is directly upstream of two or more network entities in the subset of network entities that have experienced network anomalies according to the network topology. The computer program code further comprising sets of instructions executable by the one or more processors to identify network entities from among the plurality of network entities that are root causes of the network anomalies by removing root cause candidates that have a common upstream network entity that is also a root cause candidate from the set of root cause candidates leaving a set of remaining root cause candidates that are the root causes.

The present disclosure provides one or more non-transitory computer-readable medium storing computer program code comprising sets of instructions to determine a subset of network entities from among a plurality of network entities that have experienced network anomalies during a time period based on historical network data of the plurality of network entities over the time period. The plurality of network entities being arranged in a hierarchical network topology specifying which network entities are downstream of specific network entities and which other network entities are upstream of other specific network entities. The computer program code further comprises sets of instructions to select a set of root cause candidates from among the plurality of network entities by iterating through the network topology. The set of root cause candidates being candidates for causing the network anomalies. The determination of the set root cause candidates based on the network topology and the subset of network entities that have experienced network anomalies. Each root cause candidate in the set of root cause candidates is directly upstream of two or more network entities in the subset of network entities that have experienced network anomalies according to the network topology. The computer program code comprises sets of instructions to identify network entities from among the plurality of network entities that are root causes of the network anomalies by removing root cause candidates that have a common upstream network entity that is also a root cause candidate from the set of root cause candidates leaving a set of remaining root cause candidates that are the root causes.

The present disclosure provides a computer-implemented method, comprising determining a subset of network entities from among a plurality of network entities that have experienced network anomalies during a time period based on historical network data of the plurality of network entities over the time period. The plurality of network entities being arranged in a hierarchical network topology specifying which network entities are downstream of specific network entities and which other network entities are upstream of other specific network entities. The method further comprises selecting a set of root cause candidates from among the plurality of network entities by iterating through the network topology. The set of root cause candidates being candidates for causing the network anomalies. The determination of the set root cause candidates based on the network topology and the subset of network entities that have experienced network anomalies. Each root cause candidate in the set of root cause candidates is directly upstream of two or more network entities in the subset of network entities that have experienced network anomalies according to the network topology. The method further comprises identifying network entities from among the plurality of network entities that are root causes of the network anomalies by removing root cause candidates that have a common upstream network entity that is also a root cause candidate from the set of root cause candidates leaving a set of remaining root cause candidates that are the root causes.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated and may instead be used for differentiation between different objects or elements.

As mentioned above, physical elements in a network infrastructure may be secured by redundant connections. However, it can happen that faulty component (e.g., misconfigured, damaged, worn out, or in an erroneous state) may be present in the data center for a long time without being fixed or replaced. If the redundancy for the damaged fails as well, this may break connections with other devices, which may lead to non-reachable services. In addition, even before the redundancy breaks, the network traffic at some network interfaces may break down as a precursor for an outage, or the redundant pathways may become overloaded, leading to a worse user experience.

There is a need to automatically detect failing network components and suggest possible root causes against the fact the little or no traffic (or another network anomaly) can sometimes be a normal state of certain network agents. The present disclosure provides techniques to automatically detect broken devices, misconfigured virtual components, or otherwise faulty network components that lead to downstream network anomalies in a network hierarchy.

The techniques for identifying root causes of network anomalies are described below in FIG. 1 and FIG. 2, respectively. Examples of faulty network components and downstream network anomalies are described below with respect to FIG. 3, FIG. 4, FIG. 5, and FIG. 6. And example hardware for implementing the computer system and computer-implemented method are described below with respect to FIG. 7.

At a high level, root causes of network anomalies are identified by taking all the network entities with anomalies and associating them with devices in which they are connected. Starting from devices in the highest level with anomalies, check if their attached devices have anomalies. Then take only the devices that are connected to one other device and remove these from the set of potential root causes. Then repeat with this procedure until only unconnected devices are left (e.g. one device) or each device is at least connected to two other devices. These candidate root causes are then identified as the root causes. This technique is described in further detail below.

Figure 1:
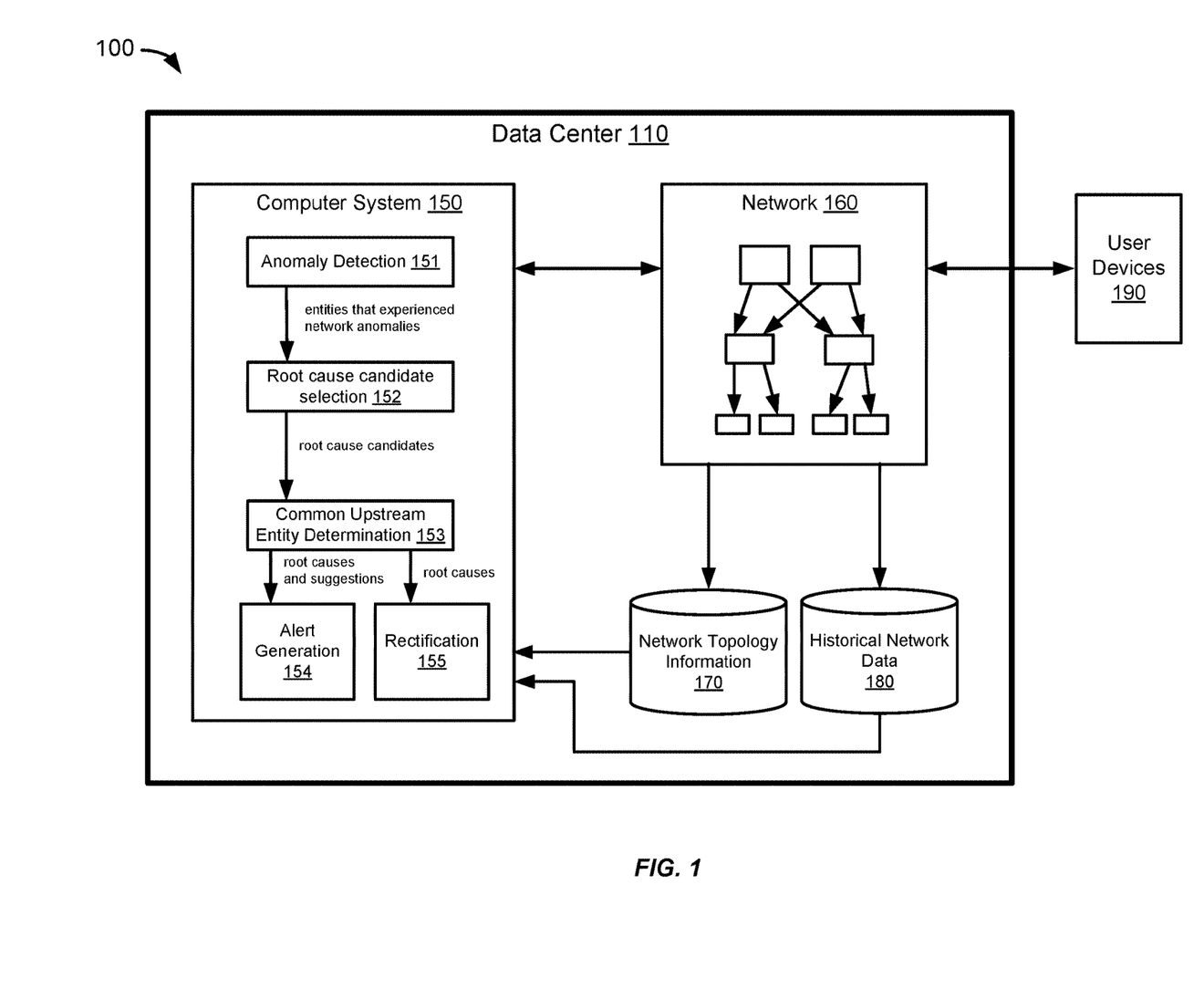
FIG. 1 shows a diagram of a computer system for identifying root causes of network anomalies, according to an embodiment.

FIG. 1 shows a diagram 100 of a computer system 150 for identifying root causes of network anomalies, according to an embodiment. The computer system 150 may be a server computer, for example. The computer system 150 may also include a plurality of computer devices working as a system. The computer system 150 may include computer hardware components such as those described below with respect to FIG. 7. The computer system 150 may be part of a data center 110 providing services to one or more user devices 190. The data center 110 may provide services to the user devices over a network 160 of the data center.

The network 160 may be a hierarchical network architecture. The structure and arrangement of the network 160 may be stored as network topology information 170. The network 160 may have a topology including switches, network cards, servers, either physical or virtual, as well as other networking entities and components thereof. Examples of topologies are shown in FIG. 3, FIG. 4, FIG. 5, and FIG. 6, which are described below.

In a hierarchical network architecture, faulty network entities, either physical or virtual network cards, switches, routers, gateways, virtual IP addresses, virtual machines, may affect the downstream entities that are connected to the faulty entity. As an example, a broken switch may affect all the devices that are connected to it at the same time, or a broken network card may as well affect all the devices or entities that are connected to it. In such situations there may be many devices that are affected but it is the broken switch or the broken network card that is the root cause affecting the downstream.

The effects of such faulty network entities may be seen as anomalies within the network. Such anomalies may be a low traffic situation or a no traffic situation at the downstream devices. For example, a faulty network device may cause its downstream devices to rely on different upstream devices that have been provided for redundancy, which may result in low traffic. In another example the redundant devices have also become faulty and the downstream devices experience no traffic. Both situations may disrupt user devices 190 accessing services provided by the data center 110.

Accordingly, it would be advantageous to identify the root causes of these network anomalies so that the faulty devices can be fixed, reconfigured, replaced, or otherwise rectified, thereby giving better network access to the services provided to the user devices 190.

The computer system 150 is configured to identify the root causes of network anomalies using network topology information 170 and historical network data 180. The network 160 comprises a plurality of network entities that are arranged in a hierarchical network topology. In a hierarchical network topology, the hierarchy may be based on a number of hops from the WAN (wide area network) access point (e.g., the connection to the Internet) This topology is specified in the network topology information. The topology information 160 specifies which network entities in the network 160 are downstream of which other specific network entities. The topology information 170 also specifies which other network entities are upstream of other specific network entities. "Downstream" network entities refer to entities that are closer to the service (e.g., a database service) being provided to the user devices 190 (e.g., higher within the network topology. "Upstream" refers to network entities that are closer to the user devices 190 (e.g., higher within the topology).

The topology information 170 may include information such as MAC addresses and which MAC addresses are connected to each other. In some cases the topology information 170 may be automatically populated and updated by the network entities.

The historical network data 180 comprises logs of network activities through the network 160 including identifiers of the communicating network entities and time stamps of the communication or other events.

An overview of the anomaly detection and root cause identification functionality of the computer system 150 is now provided and further details are given below.

To identify root causes the computer system 150 first checks if a subset of network entities of a data center have a network anomaly, such as an unusually long period of no network traffic. The unusual long period may be determined by a statistical mean, such as the percentile of non-traffic periods based on historic data, for example.

After finding out how many network entities have an anomaly in common, such as an unusually long non-traffic interval, the computer system can raise an alert whenever this exceeds a threshold. The threshold may be determined based on a simulation with historic data, for example.

In addition, the computer system 150 is configured to identify root causes for a faulty or wrongly behaving network component as follows. Each network entity is connected to the nearest neighbors of each kind (e.g., physical or virtual network cards, gateways, switches, routers, firewalls, etc.) via which network communication flows. Whenever there are more than or equal two network entities with an anomaly (e.g., an unusual long non-network traffic period), the computer system 150 checks if they have some nearest neighbor in common. If yes, the intersection of the nearest neighbors is highly likely to have caused the no-traffic since it is unlikely that two or more network entities connected to it face an unusual long non-traffic period at the same time. Consequently, the explanation for the situation in which more than one network entity has an anomaly at the same time could be the node (e.g., entity within the network topology) being in the most upstream blocking network communicating, (e.g., by damage or misconfiguration, etc.).

In some embodiments, the root causes may be identified based on the probability that anomalies occur at the same time. For example, depending on the probability that more than one network entity faces an anomaly at the same time, which determines the probability to have more than one network entity with an unusual long no traffic period at the same time connected to the same node, thresholds may be defined as to how many entities have an anomaly at the same time to trigger alerts identifying the root causes.

In case a candidate suggested to cause the network issue is contained itself in a subset of network entities that have an unusual long no network traffic period, the computer system 150 may determine that the node to which all of the entities of this subset are connected to is the root cause. Iteratively, the node identified as a candidate root cause that is most upstream in the network topology is identified to be the issue causing entity, called root cause.

In case the computer system 150 identifies a node as a root cause, then all downstream entities directly connected should be affected. To verify this, the computer system 150 may optionally perform a sanity check that all nodes connected directly downstream have anomalies or issues, such as no traffic or an unusual long period of no network traffic. This sanity check can be useful in a situation when the redundancy also breaks. In this situation anomalies can appear on several broken entities at once which could wrongly indicate that the upstream node causes the issues. However, by this sanity check some false positives can be avoided unless by coincidence non-broken entities that are directly connected to the upstream entity happen to have an anomaly at the same time.

The computer system 150 includes software components that are configured to implement the techniques described above. The software components are configured to identify root causes of network anomalies and to alert to such anomalies and in some cases rectify the anomalies. The software components of the computer system 150 includes an anomaly detection software component 151, a root cause candidate selection component 152, a common upstream entity determination component 153, an alert generation component 154, and a rectification component 155.

The anomaly detection software component 151 is configured to determine a subset of network entities (from among the plurality of network entities in the network 160) that have experienced network anomalies during a time period based on historical network data 180 of the plurality of network entities over the time period. In some embodiments, network anomalies include low traffic situations, or no traffic situations. For example, low traffic situations may be defined based on a percentage compared to mean historical traffic over a specified time period.

The root cause candidate selection component 152 is configured to select a set of root cause candidates from among the plurality of network entities by iterating through the network topology. The set of root cause candidates being candidates for causing the network anomalies. In some embodiments, the determination of the set of root cause candidates is based on the network topology information 170 and the subset of network entities that have experienced network anomalies. Each root cause candidate in the set of root cause candidates is directly upstream of two or more network entities in the subset of network entities that have experienced network anomalies according to the network topology. In some embodiments, the network topology information 170 includes intra-switch connections between network cards of a same switch, and wherein one or more of the network entities that are root causes of the network anomalies are network cards.

The common upstream entity determination component 153 to identify network entities from among the plurality of network entities that are root causes of the network anomalies by removing root cause candidates that have a common upstream network entity that is also a root cause candidate from the set of root cause candidates leaving a set of remaining root cause candidates that are the root causes. The common upstream network entities may be determined using the network topology information 170. In some embodiments, the network entities identified to be the root causes of the network anomalies may each be a most upstream network entity of their connected network entities that have the experienced network anomalies. In some embodiments, an intermediate network entity is broken and still received data but fails to send data, causing downstream devices to experience anomalies. In such cases, the network entity identified to be the root cause is the most upstream network entity that is connected to network entities experiencing anomalies.

The alert generation component 154 is configured to generate an alert identifying the network entities that are the root causes of the network anomalies, wherein the alert includes suggestions for rectifying the root causes. In some cases a faulty network entity may need to be fixed or replaced by a network engineer. In other cases, a faulty network entity may be fixed by reconfiguring it.

The rectification component 155 is configured to restart or reconfigure faulty network entities. The rectification component 155 may also be configured to replace virtual network entities. After the faulty components have been rectified, the computer system 150 may be configured to determine that the subset of network entities that experienced the network anomalies during the time period are not experiencing network anomalies during a later time period, wherein the network entities that were root causes have been fixed, reconfigured, or replaced.

As mentioned above, a sanity check may be performed to determine whether identified root causes are false positives. To do this, the computer system 150 may be configured to verify, for each of the network entities that are the root causes, that all network entities downstream of that network entity have experienced the network anomalies and to determine that network entities identified as root causes which have downstream network entities that were not verified to have experienced anomalies are false positives.

Features and advantages of this disclosure include the ability to identify root causes of network anomalies by determining the most upstream network entity in common with the network entities experiencing anomalies, thereby enabling the root cause to be rectified.

Figure 2:
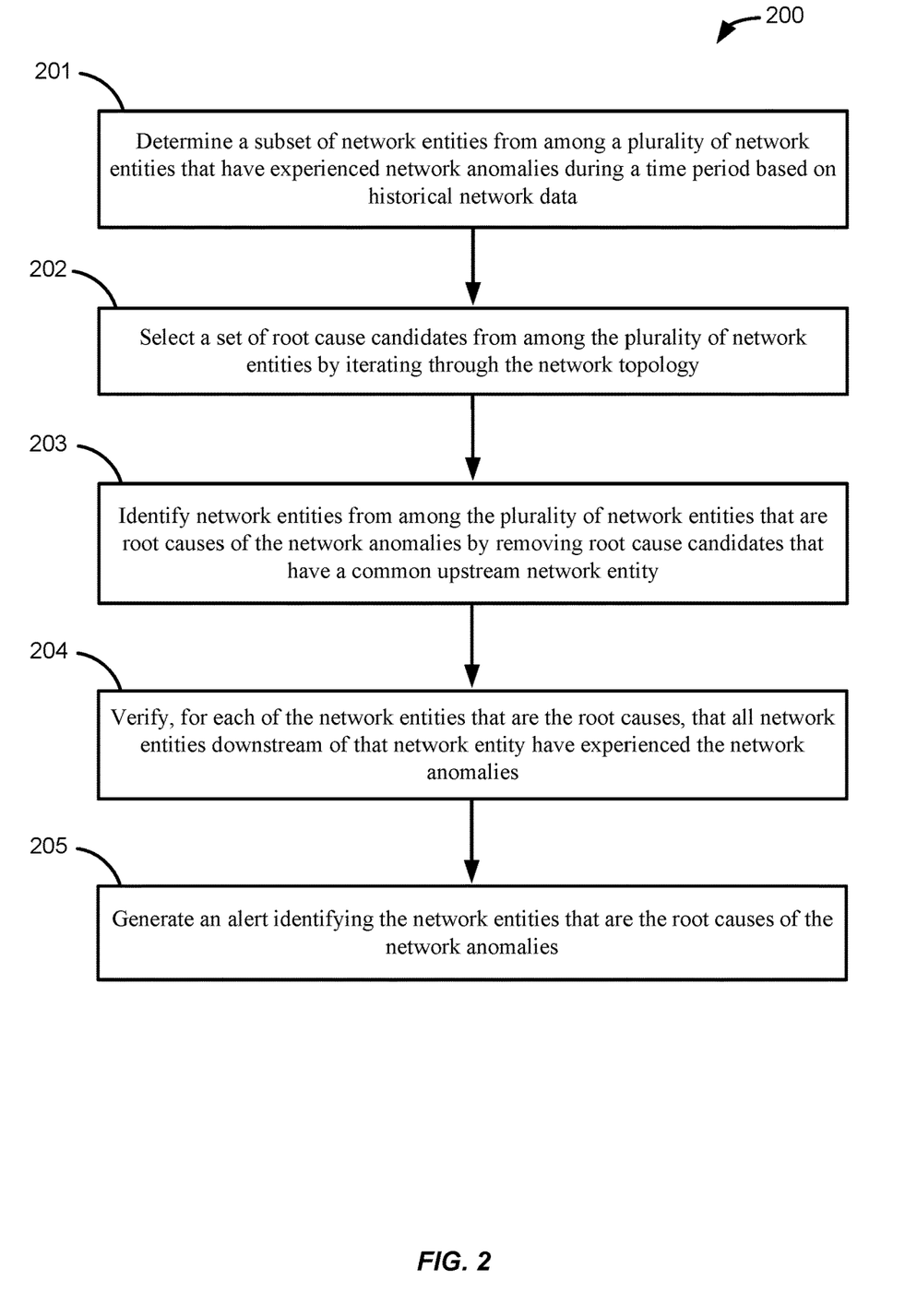
FIG. 2 shows a flowchart of a computer implemented method for identifying root causes of network anomalies, according to an embodiment.

FIG. 2 shows a flowchart 200 of a computer implemented method for identifying root causes of network anomalies, according to an embodiment. The computer implemented method may be implemented by a computer system, such as the computer system 150 described above with respect to FIG. 1.

At 201, determine a subset of network entities from among a plurality of network entities that have experienced network anomalies during a time period based on historical network data of the plurality of network entities over the time period. The plurality of network entities may be arranged in a hierarchical network topology specifying which network entities are downstream of specific network entities and which other network entities are upstream of other specific network entities. The network anomalies may include low traffic situations, no traffic situations. The network topology may include intra-switch connections between network cards of a same switch, and wherein one or more of the network entities that are root causes of the network anomalies are network cards.

At 202, select a set of root cause candidates from among the plurality of network entities by iterating through the network topology. The set of root cause candidates may be candidates for causing the network anomalies. The determination of the set root cause candidates may be based on the network topology and the subset of network entities that have experienced network anomalies. Each root cause candidate in the set of root cause candidates may be directly upstream of two or more network entities in the subset of network entities that have experienced network anomalies according to the network topology.

At 203, identify network entities from among the plurality of network entities that are root causes of the network anomalies by removing root cause candidates that have a common upstream network entity that is also a root cause candidate from the set of root cause candidates leaving a set of remaining root cause candidates that are the root causes. That is, candidates having an upstream network entity in common are not the root causes themselves but the root cause is instead the upstream entity. This process is iterative in that if that upstream entity also shares a common upstream entity with another candidate root causes, then neither of those are root causes and instead it is their common upstream network entity that is the root cause. Thus, the network entities identified to be the root causes of the network anomalies are each a most upstream network entity of their connected network entities that have the experienced network anomalies.

At 204, verify, for each of the network entities that are the root causes, that all (or a predetermined number or percentage) network entities downstream of that network entity have experienced the network anomalies and to determine that network entities identified as root causes which have a predetermined number or percentage of downstream network entities that were not verified to have experienced anomalies are false positives. In some embodiments, 204 may be optional.

At 205, generate an alert identifying the network entities that are the root causes of the network anomalies, wherein the alert includes suggestions for rectifying the root causes. The root causes of the anomalies may be rectified (e.g., the faulty entities may be reconfigured, fixed, or replaced). In some embodiments, 205 may be optional.

In some embodiments the method may also determine that the subset of network entities that experienced the network anomalies during the time period are not experiencing network anomalies during a later time period, wherein the network entities that were root causes have been fixed, reconfigured, or replaced.

Thus, the computer systems and computer implemented methods described above are advantageous in that they can automatically detect of failing network components and also suggest possible root cause against the fact the no traffic is sometimes a normal state of some network agents.

EXAMPLES

Examples of network anomalies and root causes are described below with respect to FIG. 3, FIG. 4, FIG. 5, and FIG. 6.

Figure 3:
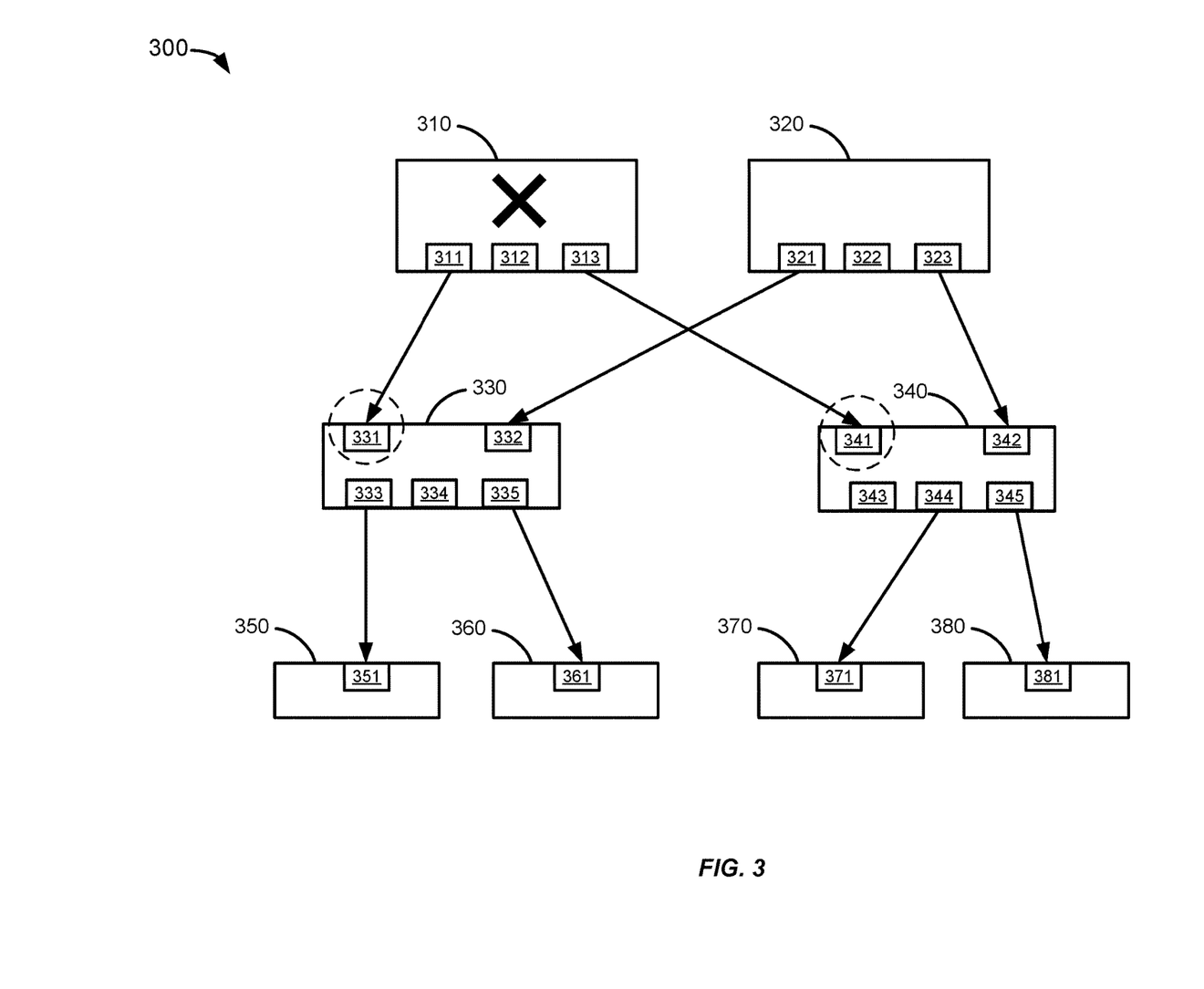
FIG. 3 shows a diagram of network anomalies at network cards having connections to different network cards of a common upstream switch, according to an embodiment.

FIG. 3 shows a diagram 300 of network anomalies at network cards having connections to different network cards of a common upstream switch, according to an embodiment. Diagram 300 includes a first network switch 310, a second network switch 320, a third network switch 330, and a fourth network switch 340. Diagram 300 also includes a first server 350, a second server 360, a third server 370, and a fourth server 380.

The first network switch 310 includes a first network card 311, a second network card 312, and a third network card 313. In this example, the first network switch 310 has failed (as indicated by the cross on switch 310 in diagram 300).

The second network switch 320 includes a first network card 321, a second network card 322, and a third network card 323.

The third network switch 330 includes a first network card 331, a second network card 332, a third network card 333, a fourth network card 334, and a fifth network card 335.

The first network card 331 of the third network switch 330 is directly downstream of the first network card 311 of the first network switch 310. In this example, the first network card 331 of the third network is experiencing an anomaly (as indicated by the dashed circle around the card 331 in diagram 300) because it is downstream of the first network card 311 of the first switch 310, which is faulty.

The second network card 332 of the third network switch 330 is directly downstream of the first network card 321 of the second network switch 320. In this example, the second network switch 320 is not faulty and is providing redundancy for the first network switch 310. Accordingly, the second network card 322 of the second network switch 320 is not experiencing an anomaly in this example.

The fourth network switch 340 includes a first network card 341, a second network card 342, a third network card 343, a fourth network card 344, and a fifth network card 345. The first network card 341 of the fourth network switch 340 is experiencing an anomaly (as indicated by the dashed circle around the card 341 in diagram 300) because it is downstream of the third network card 313 of the first switch 310, which is faulty.

The second network card 342 of the fourth network switch 340 is directly downstream of the third network card 323 of the second network switch 320. In this example, the second network switch 320 is not faulty and is providing redundancy for the first network switch 310. Accordingly, the second network card 342 of the fourth network switch 340 is not experiencing an anomaly in this example.

The first server 350 includes a first network card 351, which is downstream of the third network card 333 of the third network switch 330.

The second server 360 includes a first network card 361, which is downstream of the third network card 330.

The third server 370 includes a first network card 371, which is downstream of the fourth network card 344 of the fourth network switch 340.

The fourth server 380 includes a first network card 381, which is downstream of the fifth network card 345 of the fourth network switch 340.

In this example the first network switch 310 has failed and two network cards are experiencing an anomaly: the first network card 331 of the third switch 330 and the first network card 341 of the fourth switch 340. Both of these network cards 331 and 341 have the broken first switch 310 as a common directly connected network entity. Accordingly, the first switch 310 may be identified as the root cause of the network anomalies using the techniques described above.

Figure 4:
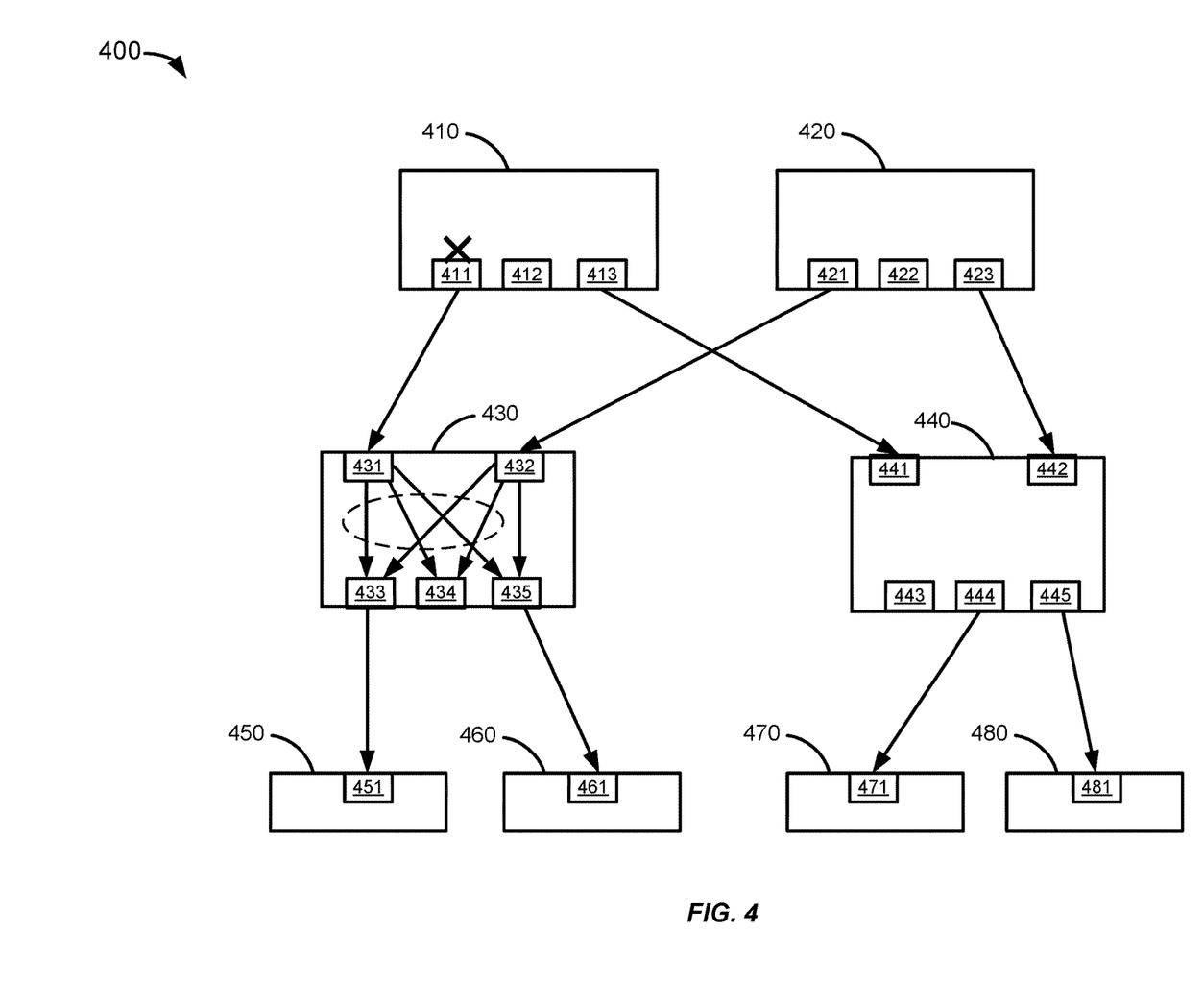
FIG. 4 shows a diagram of network anomalies at network cards having intra-switch connections with a common upstream network card, according to an embodiment.

FIG. 4 shows a diagram 400 of network anomalies at network cards having intra-switch connections with a common upstream network card, according to an embodiment. Diagram 400 includes a first network switch 410, a second network switch 420, a third network switch 430, and a fourth network switch 440. The diagram 400 also includes a first server 450, a second server 460, a third server 470, and a fourth server 480. In diagram 400, a network card of a switch has failed and intra-switch connections between network cards have unusually long periods of no network traffic. In this example, there is a direct network entity in common which is the entire connection upstream until it branches.

The first network switch 410 includes a first network card 411, a second network card 412, and a third network card 413. In this example, the first network card 411 of the first network switch 410 has failed (as indicated by the cross on that network card 411 in diagram 400).

The second network switch 420 includes a first network card 421, a second network card 422, and a third network card 423.

The third network switch 430 includes a first network card 431, a second network card 432, a third network card 433, a fourth network card 434, and a fifth network card 435. The intra-switch network connections of the third network switch 430 are shown in diagram 400. Intra-switch connections of other switches are not shown in diagram 400.

Within the third network switch 430, the third network card 433, the fourth network card 343, and the fifth network card 435 are downstream of the first network card 431. The third network card 433, the fourth network card 343, and the fifth network card 435 are also downstream of the second network card 432.

The first network card 431 of the third network switch 430 is directly downstream of the faulty first network card 411 of the first network switch 410. In this example, downstream entities of the first network card 431 of the third network are experiencing an anomaly (as indicated by the dashed circle around the intra-switch connections in diagram 400) because they are all downstream of the faulty first network card 411 of the first switch 410.

The fourth network switch 440 includes a first network card 441, a second network card 442, a third network card 443, a fourth network card 444, and a fifth network card 445. The second network card 442 of the fourth network switch 440 is directly downstream of the third network card 423 of the second network switch 420

The first server 450 includes a first network card 451, which is downstream of the third network card 433 of the third network switch 430.

The second server 460 includes a first network card 461, which is downstream of the third network card 430.

The third server 470 includes a first network card 471, which is downstream of the fourth network card 444 of the fourth network switch 440.

The fourth server 480 includes a first network card 481, which is downstream of the fifth network card 445 of the fourth network switch 440.

In this example the first network card 411 of the first network switch 410 has failed and intra-switch connections within the third network switch 430 are affected, causing a network anomaly to be experienced its network cards 431-435. Accordingly, the first network card 431 of the fourth network switch 430 may be determined to be a candidate root cause and then it may be determined that its nearest upstream network entity, the first switch card 411 of the first network card is also experiencing an anomaly (since it is faulty). Accordingly, the first network card 411 of the first network switch 410 may be identified as the root cause of the network anomalies using the techniques described above.

Figure 5:
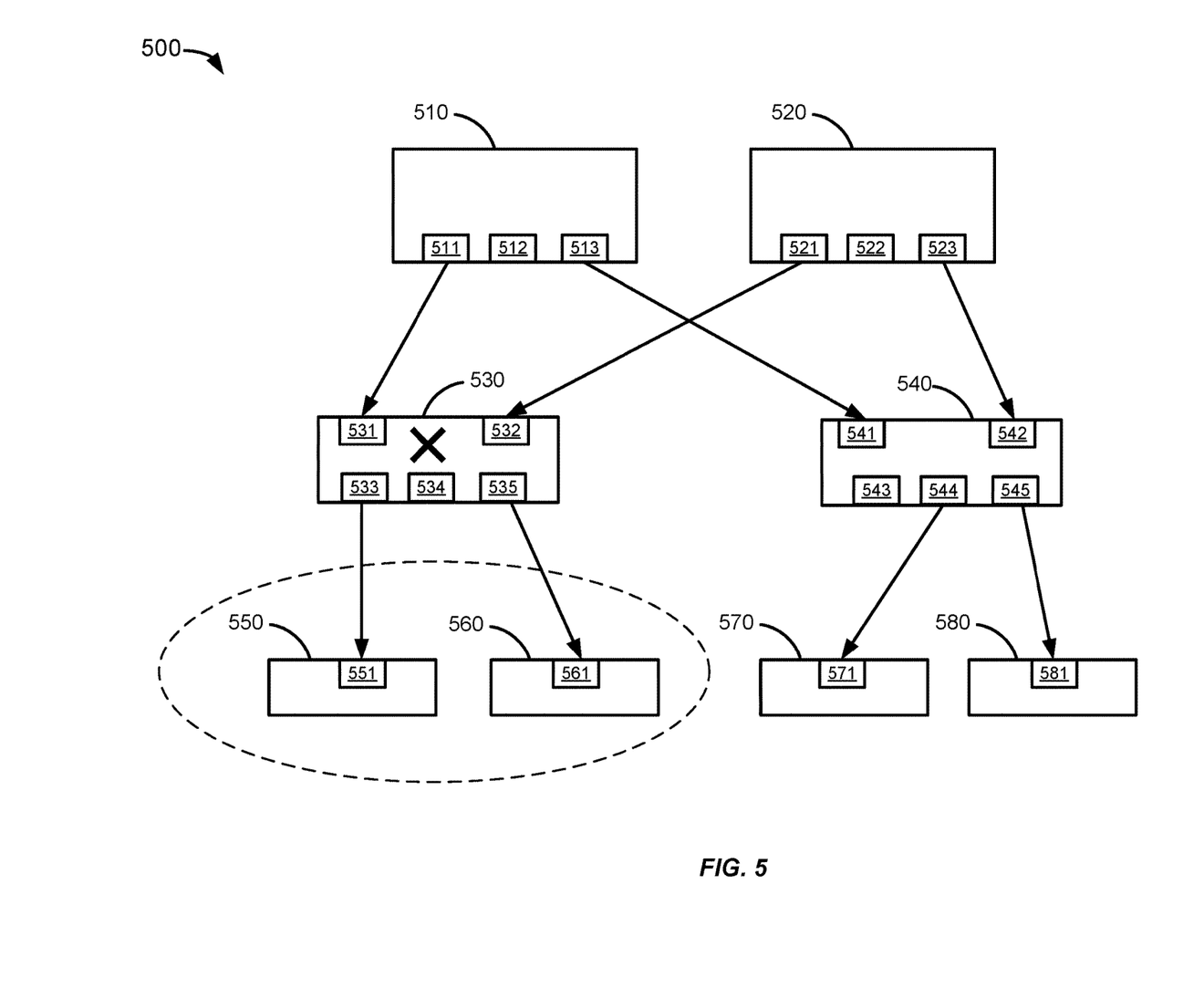
FIG. 5 shows a diagram of network anomalies at switches having connections to different network cards of a common upstream switch, according to an embodiment.

FIG. 5 shows a diagram 500 of network anomalies at switches having connections to different network cards of a common upstream switch, according to an embodiment. Diagram 500 includes a first network switch 510, a second network switch 520, a third network switch 530, and a fourth network switch 540. The diagram 500 also includes a first server 550, a second server 560, a third server 570, and a fourth server 580.

In the example in diagram 500, the network switches and servers have network cards and are configured similar to those described above in diagram 300 of FIG. 3 except that in this example, the first network card 310 is not faulty and it is the third network switch 530 that is faulty. Another difference is that in this example it is the first server 550 and the second server 560 that have anomalies, which are unusually long period of no traffic in this example. Both of these servers 550 and 560 have the faulty third network switch 530 in common as their next upstream neighbor. Accordingly, using the techniques described above, the third network switch 530 may be identified as the root cause of these anomalies.

Figure 6:
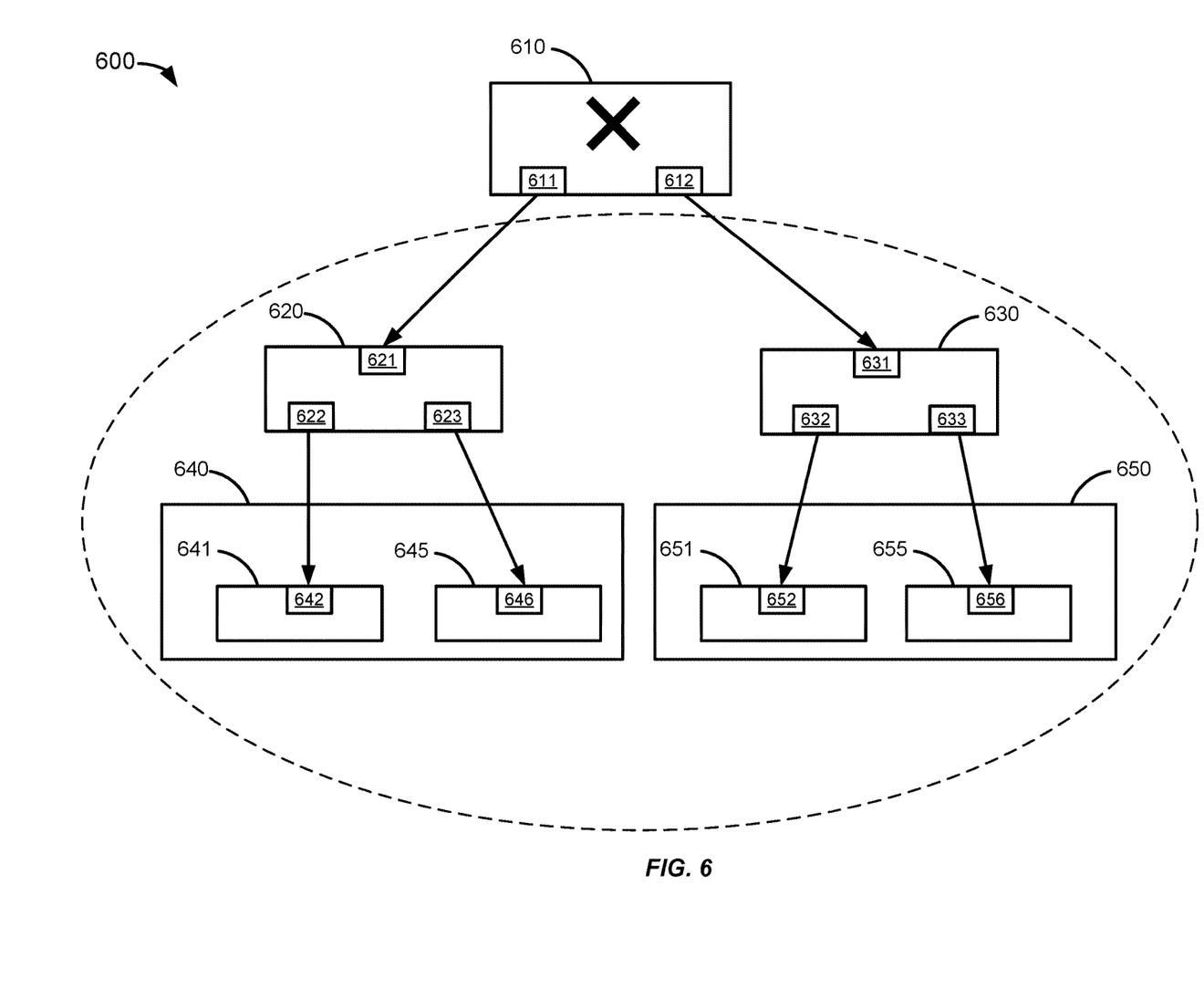
FIG. 6 shows a diagram of network anomalies at groups of servers and at switches each having a common upstream switch, according to an embodiment.

FIG. 6 shows a diagram 600 of network anomalies at groups of servers and at switches each having a common upstream switch, according to an embodiment. Diagram 600 includes a first network switch 610, a second network switch 620, a third network switch 630, a fourth network switch 641, a fifth network switch 645, a sixth network switch 651, and a seventh network switch 655. The fourth network switch 641 and the fifth network switch 645 are part of a first server 640. The sixth network switch 651 and the seventh network switch 655 are part of a second server 650.

The first network switch 610 includes a first network card 611 and a second network card 612.

The second network switch 620 includes a first network card 621, a second network card 622, and a third network card 623. Its first network card 621 is directly downstream of the first network card 611 of the first network switch 610.

The third network switch 630, includes a first network card 631, a second network card 632, and a third network card 633. Its first network card 631 is directly downstream of the second network card 612 of the first network switch 610.

The fourth network switch 641, includes a first network card 642, which is directly downstream of the second network card 622 of the second network switch 620.

The fifth network switch 645, includes a first network card 646, which is directly downstream of the third network card 623 of the second network switch 620.

The sixth network switch 651, includes a first network card 652 which is directly downstream from the second network card 632 of the third network switch 630.

The seventh network switch 655 includes a first network card 656 which is directly downstream from the third network card 633 of the third network switch 630.

In this example, the first network switch 610 is faulty and each of the other network switches 620, 630, 641, 645, 651, and 655 are experiencing network anomalies of an unusually long no traffic period. Each of these switches has a failed switch as their directly connected upstream entity in common which might cause the issue as most upstream in common entity. Also, each group of servers 640 and 650 have above a directly connected upstream entity in common.

Accordingly, using the techniques described above, the first network switch 610 may be identified as the root cause of these anomalies.

Example Hardware

Figure 7:
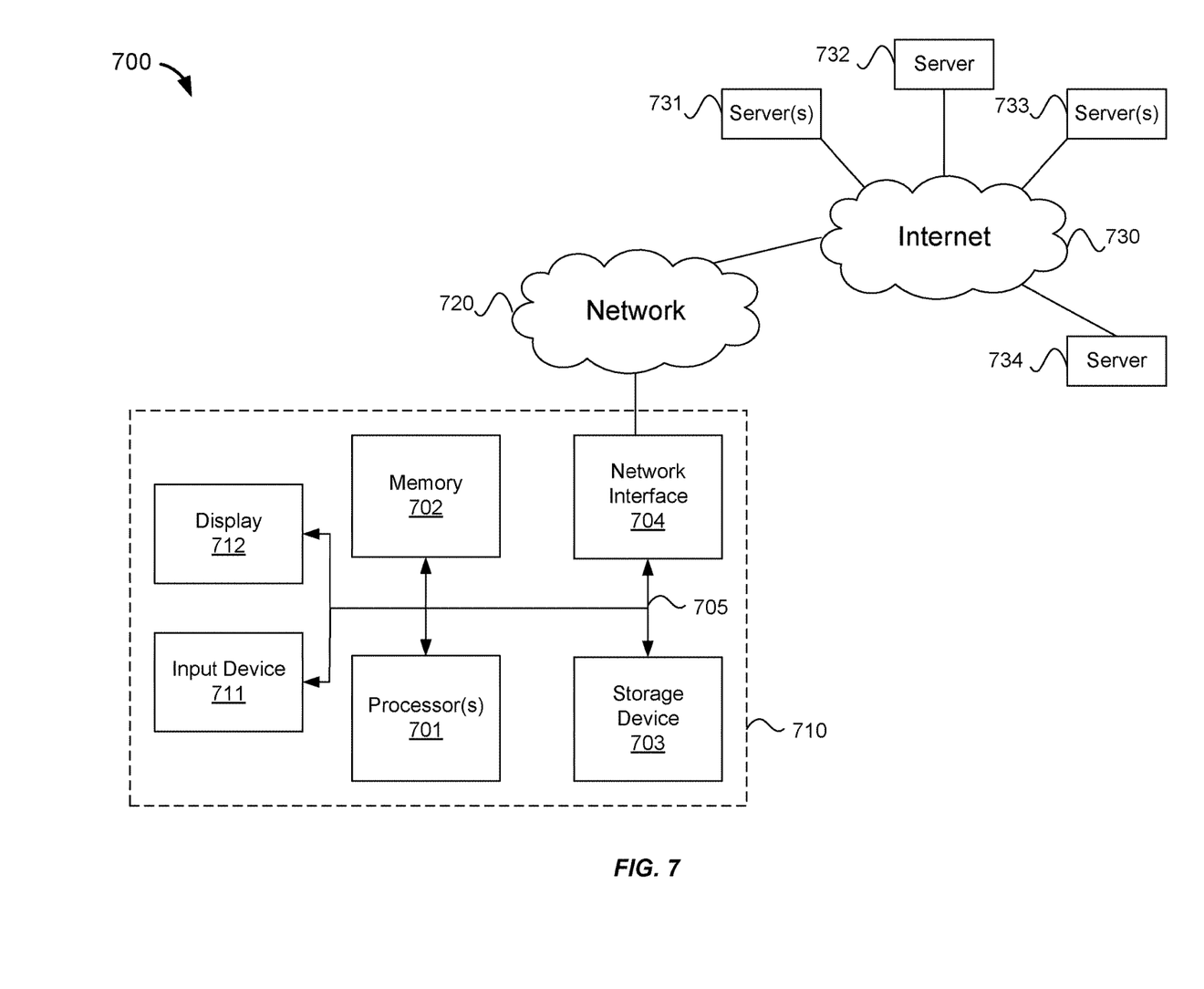
FIG. 7 shows a diagram of hardware of a special purpose computing machine for implementing systems and methods described herein.

FIG. 7 shows a diagram of hardware of a special purpose computing machine for implementing systems and methods described herein. The following hardware description is merely one example. It is to be understood that a variety of computers topologies may be used to implement the above described techniques. For instance, the computer system may implement the computer implemented method described.

An example computer system 710 is illustrated in FIG. 7. Computer system 710 includes a bus 705 or other communication mechanism for communicating information, and one or more processor(s) 701 coupled with bus 705 for processing information. Computer system 710 also includes a memory 702 coupled to bus 705 for storing information and instructions to be executed by processor 701, including information and instructions for performing some of the techniques described above, for example. This memory 702 may also be used for storing programs executed by processor(s) 701. Possible implementations of this memory may be, but are not limited to, random access memory (RAM), read only memory (ROM), or both. As such, the memory 702 is a non-transitory computer readable storage medium.

A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device and memory are both examples of non-transitory computer readable storage mediums. For example, the storage device 703 may store computer program code including instructions for implementing the method described above with respect to FIG. 2.

Computer system 710 may be coupled using bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

Computer system also includes a network interface 704 coupled with bus 705. Network interface 704 may provide two-way data communication between computer system 710 and a network 720. The network interface 704 may be a wireless or wired connection, for example. Computer system 710 can send and receive information through the network interface 704 across a local area network, an Intranet, a cellular network, or the Internet, for example. In the Internet example, a browser, for example, may access data and features on backend systems that may reside on multiple different hardware servers 731, 732, 733, 734 across the network. The servers 731-734 may be part of a cloud computing environment, for example.

Example Embodiments

Example embodiments of the techniques for machine learning based pre-submit test section are given below.

Some embodiments provide a computer system comprising one or more processors and one or more machine-readable medium coupled to the one or more processors. The one or more machine-readable medium storing computer program code comprising sets of instructions executable by the one or more processors to determine a subset of network entities from among a plurality of network entities that have experienced network anomalies during a time period based on historical network data of the plurality of network entities over the time period. The plurality of network entities being arranged in a hierarchical network topology specifying which network entities are downstream of specific network entities and which other network entities are upstream of other specific network entities. The computer program code further comprising sets of instructions executable by the one or more processors to select a set of root cause candidates from among the plurality of network entities by iterating through the network topology. The set of root cause candidates being candidates for causing the network anomalies. The determination of the set root cause candidates based on the network topology and the subset of network entities that have experienced network anomalies. Each root cause candidate in the set of root cause candidates is directly upstream of two or more network entities in the subset of network entities that have experienced network anomalies according to the network topology. The computer program code further comprising sets of instructions executable by the one or more processors to identify network entities from among the plurality of network entities that are root causes of the network anomalies by removing root cause candidates that have a common upstream network entity that is also a root cause candidate from the set of root cause candidates leaving a set of remaining root cause candidates that are the root causes.

In some embodiments of the computer system, the network entities identified to be the root causes of the network anomalies are each a most upstream network entity of their connected network entities that have the experienced network anomalies.

In some embodiments of the computer system, the computer program code further comprises sets of instructions executable by the one or more processors to verify, for each of the network entities that are the root causes, that all (or a predetermined number or percentage) network entities downstream of that network entity have experienced the network anomalies and to determine that network entities identified as root causes which have more than a predetermined number or percentage of downstream network entities that were not verified to have experienced anomalies are false positives.

In some embodiments of the computer system, the network anomalies include low traffic situations, no traffic situations, wherein low traffic situations may be defined based on a percentage compared to mean historical traffic over a specified time period for instance.

In some embodiments of the computer system, the computer program code further comprises sets of instructions executable by the one or more processors to generate an alert identifying the network entities that are the root causes of the network anomalies, wherein the alert includes suggestions for rectifying the root causes.

In some embodiments of the computer system, the computer program code further comprises sets of instructions executable by the one or more processors to determine that the subset of network entities that experienced the network anomalies during the time period are not experiencing network anomalies during a later time period, wherein the network entities that were root causes have been fixed, reconfigured, or replaced.

In some embodiments of the computer system, the network topology includes intra-switch connections between network cards of a same switch, and wherein one or more of the network entities that are root causes of the network anomalies are network cards.

Some embodiments provide one or more non-transitory computer-readable medium storing computer program code. The computer program code comprises sets of instructions to determine a subset of network entities from among a plurality of network entities that have experienced network anomalies during a time period based on historical network data of the plurality of network entities over the time period. The plurality of network entities being arranged in a hierarchical network topology specifying which network entities are downstream of specific network entities and which other network entities are upstream of other specific network entities. The computer program code further comprises sets of instructions to select a set of root cause candidates from among the plurality of network entities by iterating through the network topology. The set of root cause candidates being candidates for causing the network anomalies. The determination of the set root cause candidates based on the network topology and the subset of network entities that have experienced network anomalies. Each root cause candidate in the set of root cause candidates is directly upstream of two or more network entities in the subset of network entities that have experienced network anomalies according to the network topology. The computer program code comprises sets of instructions to identify network entities from among the plurality of network entities that are root causes of the network anomalies by removing root cause candidates that have a common upstream network entity that is also a root cause candidate from the set of root cause candidates leaving a set of remaining root cause candidates that are the root causes.

In some embodiments of the non-transitory computer-readable medium the network entities identified to be the root causes of the network anomalies are each a most upstream network entity of their connected network entities that have the experienced network anomalies.

In some embodiments of the non-transitory computer-readable medium, the computer program code further comprises sets of instructions to verify, for each of the network entities that are the root causes, that all network entities downstream of that network entity have experienced the network anomalies and to determine that network entities identified as root causes which have downstream network entities that were not verified to have experienced anomalies are false positives.

In some embodiments of the non-transitory computer-readable medium the network anomalies include low traffic situations, no traffic situations. As an example, low traffic situations may be defined based on a percentage compared to mean historical traffic over a specified time period. Low traffic situations may also be defined in other ways.

In some embodiments of the non-transitory computer-readable medium the computer program code further comprises sets of instructions to generate an alert identifying the network entities that are the root causes of the network anomalies, wherein the alert includes suggestions for rectifying the root causes.

In some embodiments of the non-transitory computer-readable medium the computer program code further comprises sets of instructions to determine that the subset of network entities that experienced the network anomalies during the time period are not experiencing network anomalies during a later time period. The network entities that were root causes have been fixed, reconfigured, or replaced.

In some embodiments of the non-transitory computer-readable medium, the network topology includes intra-switch connections between network cards of a same switch, and wherein one or more of the network entities that are root causes of the network anomalies are network cards.

Some embodiments provide a computer-implemented method. The method comprises determining a subset of network entities from among a plurality of network entities that have experienced network anomalies during a time period based on historical network data of the plurality of network entities over the time period. The plurality of network entities being arranged in a hierarchical network topology specifying which network entities are downstream of specific network entities and which other network entities are upstream of other specific network entities. The method further comprises selecting a set of root cause candidates from among the plurality of network entities by iterating through the network topology. The set of root cause candidates being candidates for causing the network anomalies. The determination of the set of root cause candidates based on the network topology and the subset of network entities that have experienced network anomalies. Each root cause candidate in the set of root cause candidates is directly upstream of two or more network entities in the subset of network entities that have experienced network anomalies according to the network topology. The method further comprises identifying network entities from among the plurality of network entities that are root causes of the network anomalies by removing root cause candidates that have a common upstream network entity that is also a root cause candidate from the set of root cause candidates leaving a set of remaining root cause candidates that are the root causes.

In some embodiments of the computer-implemented method, the network entities identified to be the root causes of the network anomalies are each a most upstream network entity of their connected network entities that have the experienced network anomalies. In other embodiments, this may not necessarily be the case.

In some embodiments of the computer-implemented method, the method further comprises verifying, for each of the network entities that are the root causes, that all (or a predetermined number or percentage of) network entities downstream of that network entity have experienced the network anomalies and determining that network entities identified as root causes which have more than a predetermined number or percentage of downstream network entities that were not verified to have experienced anomalies are false positives.

In some embodiments of the computer-implemented method, the network anomalies include low traffic situations, no traffic situations.

In some embodiments of the computer-implemented method, the method further comprises generating an alert identifying the network entities that are the root causes of the network anomalies, wherein the alert includes suggestions for rectifying the root causes.

In some embodiments of the computer-implemented method, the method further comprises determining that the subset of network entities that experienced the network anomalies during the time period are not experiencing network anomalies during a later time period, wherein the network entities that were root causes have been fixed, reconfigured, or replaced.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors; and
   one or more machine-readable medium coupled to the one or more processors and storing computer program code comprising sets of instructions executable by the one or more processors to:
   determine a subset of network entities from among a plurality of network entities that have experienced network anomalies during a time period based on historical network data of the plurality of network entities over the time period, the plurality of network entities being arranged in a hierarchical network topology specifying which network entities are downstream of specific network entities and which other network entities are upstream of other specific network entities;
   select a set of root cause candidates from among the plurality of network entities by iterating through the network topology, the set of root cause candidates being candidates for causing the network anomalies, the selection of the set root cause candidates based on the network topology and the subset of network entities that have experienced network anomalies, wherein each root cause candidate in the set of root cause candidates is directly upstream of two or more network entities in the subset of network entities that have experienced network anomalies according to the network topology; and
   identify network entities from among the plurality of network entities that are root causes of the network anomalies by removing root cause candidates that have a common upstream network entity that is also a root cause candidate from the set of root cause candidates leaving a set of remaining root cause candidates that are the root causes.

2. The computer system of claim 1, wherein the network entities identified to be the root causes of the network anomalies are each a most upstream network entity of their connected network entities that have the experienced network anomalies.

3. The computer system of claim 1, wherein the computer program code further comprises sets of instructions executable by the one or more processors to:
   verify, for each of the network entities that are the root causes, that at least a predetermined number or percentage of network entities downstream of that network entity have experienced the network anomalies; and
   determine that network entities identified as root causes which have more than a predetermined number or percentage of downstream network entities that were not verified to have experienced anomalies are false positives.

4. The computer system of claim 1, wherein the network anomalies include low traffic situations, no traffic situations.

5. The computer system of claim 1, wherein the computer program code further comprises sets of instructions executable by the one or more processors to:
generate an alert identifying the network entities that are the root causes of the network anomalies, wherein the alert includes suggestions for rectifying the root causes.

6. The computer system of claim 5, wherein the computer program code further comprises sets of instructions executable by the one or more processors to:
determine that the subset of network entities that experienced the network anomalies during the time period are not experiencing network anomalies during a later time period, wherein the network entities that were root causes have been fixed, reconfigured, or replaced.

7. The computer system of claim 1, wherein the network topology includes intra-switch connections between network cards of a same switch, and wherein one or more of the network entities that are root causes of the network anomalies are network cards.

8. One or more non-transitory computer-readable medium storing computer program code comprising sets of instructions to:
determine a subset of network entities from among a plurality of network entities that have experienced network anomalies during a time period based on historical network data of the plurality of network entities over the time period, the plurality of network entities being arranged in a hierarchical network topology specifying which network entities are downstream of specific network entities and which other network entities are upstream of other specific network entities;
select a set of root cause candidates from among the plurality of network entities by iterating through the network topology, the set of root cause candidates being candidates for causing the network anomalies, the selection of the set of root cause candidates based on the network topology and the subset of network entities that have experienced network anomalies, wherein each root cause candidate in the set of root cause candidates is directly upstream of two or more network entities in the subset of network entities that have experienced network anomalies according to the network topology; and
identify network entities from among the plurality of network entities that are root causes of the network anomalies by removing root cause candidates that have a common upstream network entity that is also a root cause candidate from the set of root cause candidates leaving a set of remaining root cause candidates that are the root causes.

9. The non-transitory computer-readable medium of claim 8, wherein the network entities identified to be the root causes of the network anomalies are each a most upstream network entity of their connected network entities that have the experienced network anomalies.

10. The non-transitory computer-readable medium of claim 8, wherein the computer program code further comprises sets of instructions to:
verify, for each of the network entities that are the root causes, that at least a predetermined number or percentage of network entities downstream of that network entity have experienced the network anomalies; and
determine that network entities identified as root causes which have more than a predetermined number or percentage of downstream network entities that were not verified to have experienced anomalies are false positives.

11. The non-transitory computer-readable medium of claim 8, wherein the network anomalies include low traffic situations, no traffic situations.

12. The non-transitory computer-readable medium of claim 8, wherein the computer program code further comprises sets of instructions to:
generate an alert identifying the network entities that are the root causes of the network anomalies, wherein the alert includes suggestions for rectifying the root causes.

13. The non-transitory computer-readable medium of claim 12, wherein the computer program code further comprises sets of instructions to:
determine that the subset of network entities that experienced the network anomalies during the time period are not experiencing network anomalies during a later time period, wherein the network entities that were root causes have been fixed, reconfigured, or replaced.

14. The non-transitory computer-readable medium of claim 8, wherein the network topology include intra-switch connections between network cards of a same switch, and wherein one or more of the network entities that are root causes of the network anomalies are network cards.

15. A computer-implemented method, comprising:
determining a subset of network entities from among a plurality of network entities that have experienced network anomalies during a time period based on historical network data of the plurality of network entities over the time period, the plurality of network entities being arranged in a hierarchical network topology specifying which network entities are downstream of specific network entities and which other network entities are upstream of other specific network entities;
selecting a set of root cause candidates from among the plurality of network entities by iterating through the network topology, the set of root cause candidates being candidates for causing the network anomalies, the selection of the set of root cause candidates based on the network topology and the subset of network entities that have experienced network anomalies, wherein each root cause candidate in the set of root cause candidates is directly upstream of two or more network entities in the subset of network entities that have experienced network anomalies according to the network topology; and
identifying network entities from among the plurality of network entities that are root causes of the network anomalies by removing root cause candidates that have a common upstream network entity that is also a root cause candidate from the set of root cause candidates leaving a set of remaining root cause candidates that are the root causes.

16. The computer-implemented method of claim 15, wherein the network entities identified to be the root causes of the network anomalies are each a most upstream network entity of their connected network entities that have the experienced network anomalies.

17. The computer-implemented method of claim 15, further comprising:
verifying, for each of the network entities that are the root causes, that at least a predetermined number or percentage of many network entities downstream of that network entity have experienced the network anomalies; and determining that network entities identified as root causes which have more than a predetermined number or percentage of downstream network entities that were not verified to have experienced anomalies are false positives.

18. The computer-implemented method of claim 15, wherein the network anomalies include low traffic situations, no traffic situations.

19. The computer-implemented method of claim 15, further comprising:
   generating an alert identifying the network entities that are the root causes of the network anomalies, wherein the alert includes suggestions for rectifying the root causes.

20. The computer-implemented method of claim 19, further comprising:
   determining that the subset of network entities that experienced the network anomalies during the time period are not experiencing network anomalies during a later time period, wherein the network entities that were root causes have been fixed, reconfigured, or replaced.

* * * * *